US012760822B2

(12) United States Patent
Emrud et al.

(10) Patent No.: US 12,760,822 B2
(45) Date of Patent: Oct. 13, 2026

(54) POPPET COUPLING

(71) Applicant: TechnipFMC Norge AS, Kongsberg (NO)

(72) Inventors: Lars Erik Emrud, Kongsberg (NO); Inge Østergaard, Heggedal (NO)

(73) Assignee: TechnipFMC Norge AS, Kongsberg (NO)

( * ) Notice: Subject to any disclaimer, the term of this patent is extended or adjusted under 35 U.S.C. 154(b) by 0 days.

(21) Appl. No.: 18/845,817

(22) PCT Filed: Mar. 10, 2023

(86) PCT No.: PCT/EP2023/056127
§ 371 (c)(1),
(2) Date: Sep. 10, 2024

(87) PCT Pub. No.: WO2023/170255
PCT Pub. Date: Sep. 14, 2023

(65) Prior Publication Data

US 2025/0198553 A1 Jun. 19, 2025

(30) Foreign Application Priority Data

Mar. 10, 2022 (NO) .................................... 20220306

(51) Int. Cl.
*F16L 29/04* (2006.01)
*F16L 37/35* (2006.01)
*F16L 1/26* (2006.01)

(52) U.S. Cl.
CPC ............... *F16L 29/04* (2013.01); *F16L 37/35* (2013.01); *F16L 1/26* (2013.01)

(58) Field of Classification Search
CPC . F16L 29/04; F16L 37/35; F16L 37/32; F16L 1/26
See application file for complete search history.

(56) References Cited

U.S. PATENT DOCUMENTS 4,694,859 A * 9/1987 Smith, III ................. F16L 1/26 285/11
4,709,726 A * 12/1987 Fitzgibbons .......... E21B 33/038 137/614.04

(Continued)

FOREIGN PATENT DOCUMENTS

GB 2286643 A 8/1995
WO WO-02063131 A1 * 8/2002 ............. F16L 29/04

OTHER PUBLICATIONS

International Search Report and Written Opinion for Application No. PCT/EP2023/056127, dated Apr. 5, 2023.

(Continued)

*Primary Examiner* — David Colon-Morales
(74) *Attorney, Agent, or Firm* — Kevin E. West; Advent, LLP

(57) ABSTRACT

A poppet coupling comprising a male member comprising a cylindrical body part comprising a first outer diameter, and a cylindrical nose part having a second outer diameter, at an end which is to be inserted into a female member first; and the female member comprising an end opening for receiving the male member first, a primary seal for engaging the cylindrical body part, a cone-shaped opening, and a cylindrical opening, the cylindrical opening having a first inner diameter for receiving the cylindrical nose part.

20 Claims, 6 Drawing Sheets

(56) References Cited

U.S. PATENT DOCUMENTS 4,768,538 A * 9/1988 Mintz ................. E21B 33/0355 137/614.04
4,813,454 A * 3/1989 Smith, III ............... F16L 37/32 137/614.04
4,817,668 A * 4/1989 Smith, III ................. F16L 1/26 137/614.04
4,832,080 A * 5/1989 Smith, III ................. F16L 1/26 137/614.04
4,858,648 A * 8/1989 Smith, III ............... F16L 37/32 137/614.04
4,884,584 A * 12/1989 Smith ..................... F16L 37/32 137/614.04
5,015,016 A * 5/1991 Smith, III ............... F16L 39/00 137/614.04
5,029,613 A * 7/1991 Smith, III ............... F16L 37/32 285/379
5,052,439 A * 10/1991 Smith, III ................. F16L 1/26 285/379
5,277,225 A * 1/1994 Smith ................... F16L 17/035 137/614.04
5,284,183 A * 2/1994 Smith, III ............... F16L 37/58 137/614.04
5,339,861 A * 8/1994 Smith, III ............... F16L 37/32 137/614.04
5,355,909 A * 10/1994 Smith, III ............... F16L 29/04 137/614.04
5,365,972 A * 11/1994 Smith, III ............... F16L 37/35 137/614.04
5,370,153 A * 12/1994 Galle ...................... F16L 29/04 251/149.6
5,390,702 A * 2/1995 Smith, III ............... F16L 29/04 137/614.04
5,469,887 A * 11/1995 Smith, III ............... F16L 37/35 137/614.04
5,771,927 A * 6/1998 Johansen .............. E21B 33/038 137/614.04
5,983,934 A * 11/1999 Smith, III ............... F16L 29/04 137/614.04
6,085,785 A * 7/2000 Smith, III ............... F16L 37/30 137/614.04
6,095,191 A * 8/2000 Smith, III ............... F16L 37/62 137/614.04
6,123,103 A * 9/2000 Smith, III ............... F16L 29/04 137/614.04
6,123,104 A * 9/2000 Smith, III ............... F16L 29/04 137/614.04
6,173,742 B1 * 1/2001 Smith, III ............. E21B 33/038 285/361
6,179,002 B1 * 1/2001 Smith, III ............... F16L 29/04 137/614.04
6,202,690 B1 * 3/2001 Smith, III ............... F16L 37/32 137/614.04
6,206,040 B1 * 3/2001 Smith, III ............... F16L 29/00 137/614.04
6,575,430 B1 * 6/2003 Smith, III ............... F16L 29/04 251/149.6
7,117,891 B2 * 10/2006 Magnus .................. F16L 29/02 251/149.6
7,401,627 B2 * 7/2008 Magnus .................. F16L 37/34 251/149.6
7,578,312 B2 * 8/2009 Smith, III ................. F16L 1/26 137/614.04
7,810,785 B2 * 10/2010 Smith, III ............... F16L 37/32 137/614.04
7,913,974 B2 * 3/2011 Smith, III ................. F16L 1/26 137/614.04
8,132,780 B2 * 3/2012 Tibbitts ................... F16L 37/32 137/614.04
8,196,607 B2 * 6/2012 Kirkman ................. F16L 37/32 137/614.04
10,400,541 B2 * 9/2019 Smith, III ............ F16J 15/0887
10,557,577 B2 * 2/2020 Smith, III ............... F16L 57/06
11,614,187 B2 * 3/2023 Smith, III ............... F16L 17/03 137/614.04
12,173,824 B2 * 12/2024 Smith, III ........... E21B 33/0355
2011/0101675 A1 * 5/2011 Smith, III ............... F16L 25/01 285/119
2018/0135785 A1 * 5/2018 Koller ..................... F16L 37/56

OTHER PUBLICATIONS

Communication pursuant to Article 94(3) EPC, for Application No. 23710991.3, dated Sep. 9, 2025.

Office action in Norway in patent application No. 20220306, dated Sep. 27, 2022.

* cited by examiner

POPPET COUPLING

TECHNICAL FIELD

The present disclosure relates to a poppet coupling and a method for guiding and connecting misaligned male and female members of such a coupling. More particularly, the present disclosure relates to a subsea poppet coupling for fluid, generally used in the oil and gas industry.

BACKGROUND

A coupling, such as a poppet coupling, has a male member and a female member. A mechanical device displaces a support provided with the male member towards another support provided with the female member. The male member and the female member may therefore not be well aligned with respect to each other during the connection process of the two members. This may render the connection process difficult and the coupling may leak.

A problem with these couplings is that seals in the coupling may be damaged or not sealing properly due to the misalignment. The coupling must also withstand heat and pressure from within the coupling and also from outside the coupling. The coupling must be able to connect and disconnect many times, not just once or just a few times.

A further problem is that the connection may take place subsea, possibly at several thousand meters depth. This results in further problems such as high pressures outside the coupling. The female member may have water inside that prevents the male member from entering properly. The coupling must also ensure that a fluid flow connected by the coupling cannot escape to the environment, for example out in the sea. The coupling must also comply with regulations and standards, especially environmental regulations and standards.

A further technical problem is that any part of the coupling must function without a possibility to fail, fulfill technical and legal requirements, and be easy to use. It is desirable that any solution is simple, not expensive to produce, and is reliable. It is further a technical problem to avoid cumbersome arrangements that are expensive to manufacture or assemble.

SUMMARY

The present disclosure is directed to a poppet coupling and a method for guiding and connecting misaligned male and female members of the coupling.

According to one embodiment, a poppet coupling comprises a male member comprising a cylindrical body part comprising a first outer diameter, and a cylindrical nose part having a second outer diameter, at an end which is to be inserted into a female member first; the female member comprising an end opening for receiving the male member first, a primary seal for engaging the cylindrical body part, a cone-shaped opening, and a cylindrical opening, the cylindrical opening having a first inner diameter for receiving the cylindrical nose part. The primary seal is a metal seal; the second outer diameter and the first inner diameter are complementary to allow the cylindrical nose part to be slidable inserted into the cylindrical opening guiding and aligning the male member and the female member; the cone-shaped opening opens up from the cylindrical opening, and the cone-shaped opening opens towards the end opening; the primary seal is arranged between the end opening and the cone-shaped opening, and the primary seal being arranged to seal against an outside of the cylindrical body part with the first outer diameter of the male member; and at least a part of the cylindrical nose part is inside the cylindrical opening when the primary seal initially engages the outside of the cylindrical body part with the first outer diameter of the male member, when the male member is inserted into the female member.

According to one embodiment, the male member comprises a first valve element with a first extension; and the female member comprises a second valve element with a second extension; and the first extension and the second extension engage each other and open the first valve element and/or the second valve element when the primary seal initially engages the outside of the cylindrical body part with the first outer diameter of the male member when the male member is inserted into the female member to connect the coupling.

According to one embodiment, the primary seal and the male member are arranged such that the second valve element is open when the primary seal initially engages the outside of the cylindrical body part, when the male member is inserted into the female member to connect the coupling.

According to one embodiment, the male member comprises a cone-shaped surface extending in the axial direction and connects the cylindrical body part with the cylindrical nose part, the first outer diameter of the cylindrical body part being larger than the second outer diameter of the cylindrical nose part.

According to one embodiment, the end of the cylindrical nose part of the male member comprises a circumferential rounded outer corner, and a groove extending in the axial direction from the end to the cone-shaped surface.

According to one embodiment, the cone-shaped surface is configured such that there is a clearance between the cone-shaped surface and the cone-shaped opening, when the male member is fully inserted in the female member.

According to one embodiment, the primary seal is a circumferential metal seal held in place by a support ring, the metal seal comprises a lip for engaging the outside of the cylindrical body part with the first outer diameter of the male member.

According to one embodiment, at least a quarter of an axial length of the cylindrical nose part of the male member is inside the cylindrical opening before the primary seal engages the outside of the cylindrical body part with the first outer diameter of the male member, when the male member is inserted into the female member.

According to one embodiment, the poppet coupling further comprises a secondary seal and an environmental seal, the secondary seal being positioned between the primary seal and the environmental seal, and the environmental seal sealing the inside of the coupling against the outer environment, when the male member is fully inserted into the female member.

According to one embodiment, the secondary seal and the environmental seal are polymer seals, and are arranged in the female member such that they seal against the cylindrical body part when the cylindrical nose part of the male member engages the cylindrical opening.

According to one embodiment, the poppet coupling further comprises a spring arranged inside a first hollow cylinder and a second hollow cylinder, a spring force of the spring closing the second valve element of the female member, and the two hollow cylinders are configured to limit an axial movement of the second valve element within the female member.

According to one embodiment, the poppet coupling comprises a spring arranged in a third hollow cylinder and a fourth hollow cylinder, a spring force of the spring closing the first valve element of the male member, and the two hollow cylinders are configured to limit an axial movement of the first valve element within the male member.

According to one embodiment, the male member, or the female member, is arranged to move perpendicular to the direction of insertion.

According to one embodiment, a system comprises one or more poppet couplings according to any one of the preceding embodiments. The system further comprises a first subsea member comprising a first multi-quick connector (MQC) plate, the first MQC plate comprising e.g. the male members of the plurality of poppet couplings; a second subsea member comprising a second MQC plate, the second MQC plate comprising e.g. the female members of the plurality of poppet couplings, respectively. The first subsea member and the second subsea member are configured to coarsely align relative to each other when connected to each other, and each poppet coupling provide a further alignment and a subsequent fine alignment.

According to one embodiment, several poppet couplings are arranged to form a multi-poppet coupling between two subsea members.

According to at least one embodiment a method for guiding and connecting the male member and the female member of the poppet coupling according to any one of the preceding embodiments is disclosed. The male member and the female member being initially misaligned and subsea, the method comprising arranging the male member, or the female member, so that they can move perpendicular to the direction of insertion; and inserting the male member into the female member.

According to at least one embodiment, a poppet coupling with misaligned male and female members are coupled. Such a poppet coupling ensures tight sealing and that the coupling can be connected and disconnected many times. At least one embodiment can withstand heat and high pressures from outside as well as inside. At least one embodiment is simple, not expensive to produce, and is reliable. At least one embodiment avoids cumbersome arrangements that are expensive to manufacture or assemble.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment or embodiments.

BRIEF DESCRIPTION OF THE DRAWINGS

The accompanying drawings illustrate presently exemplary embodiments of the disclosure and serve to explain, by way of example, the principles of the disclosure.

DETAILED DESCRIPTION

Figure 1:
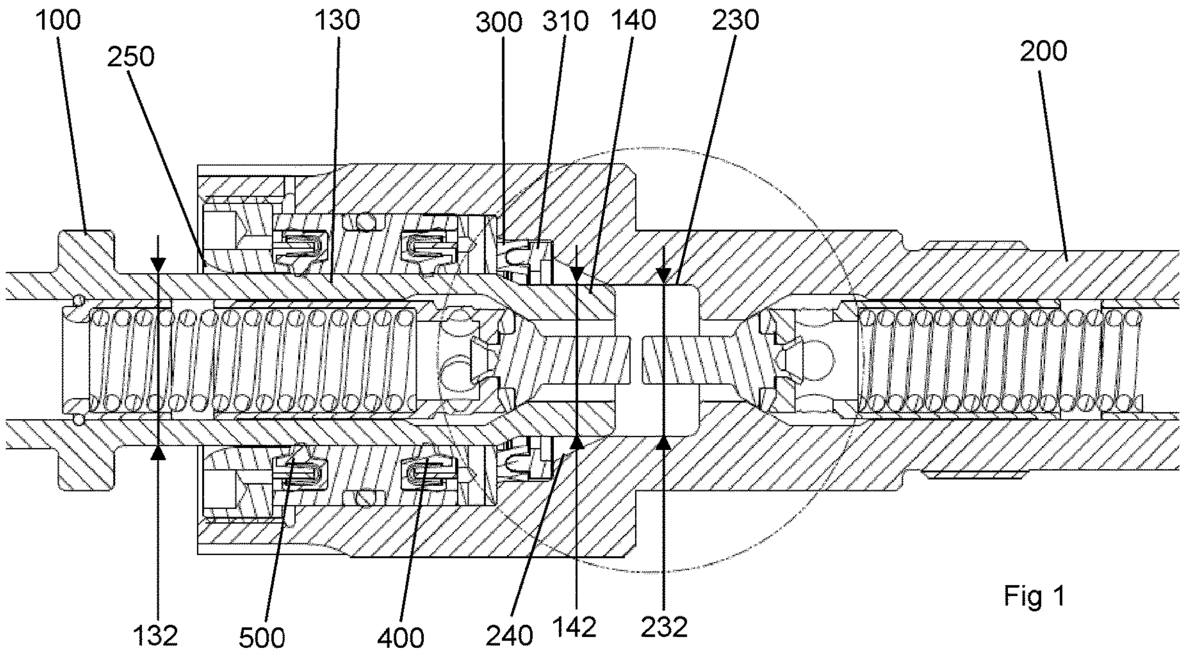
FIG. 1 is a diagrammatic illustration of a poppet coupling according to an exemplary embodiment of the disclosure.
Figure 2:
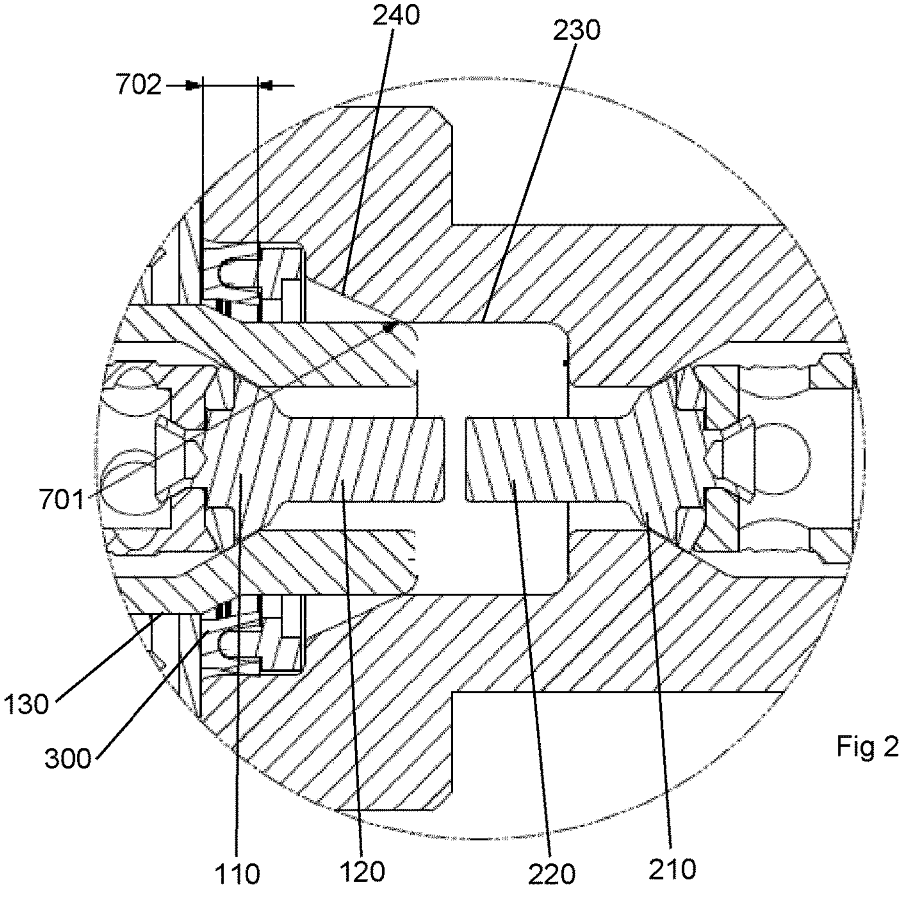
FIG. 2 is a diagrammatic illustration of a detail from FIG. 1.
Figure 3:
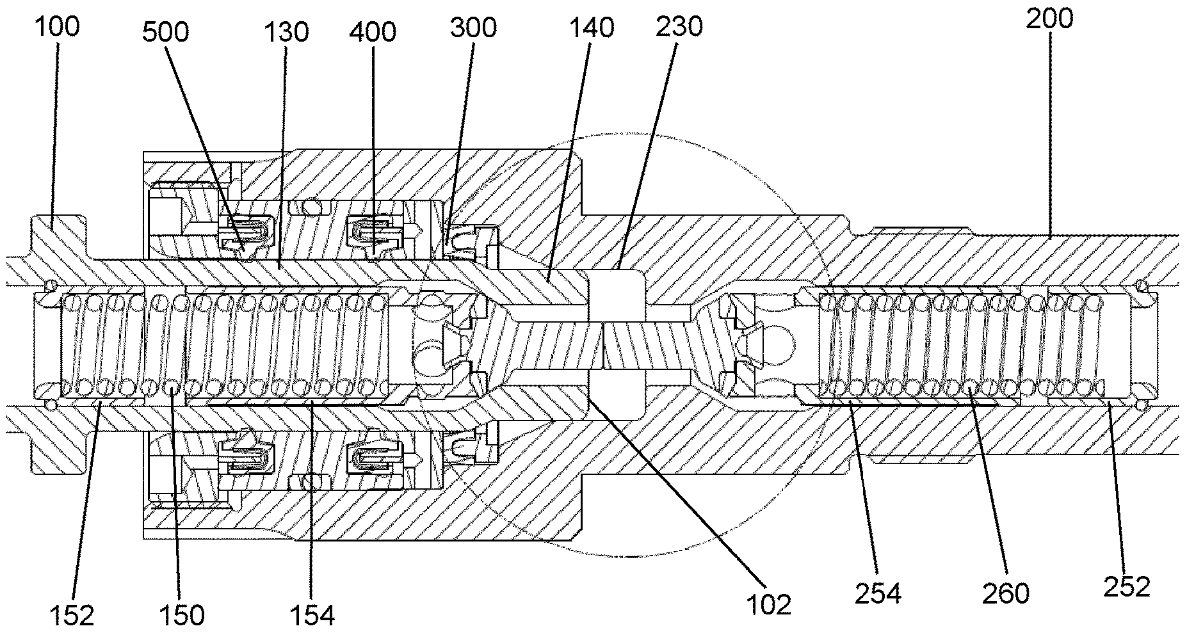
FIG. 3 is a diagrammatic illustration of a poppet coupling according to an exemplary embodiment of the disclosure.
Figure 4:
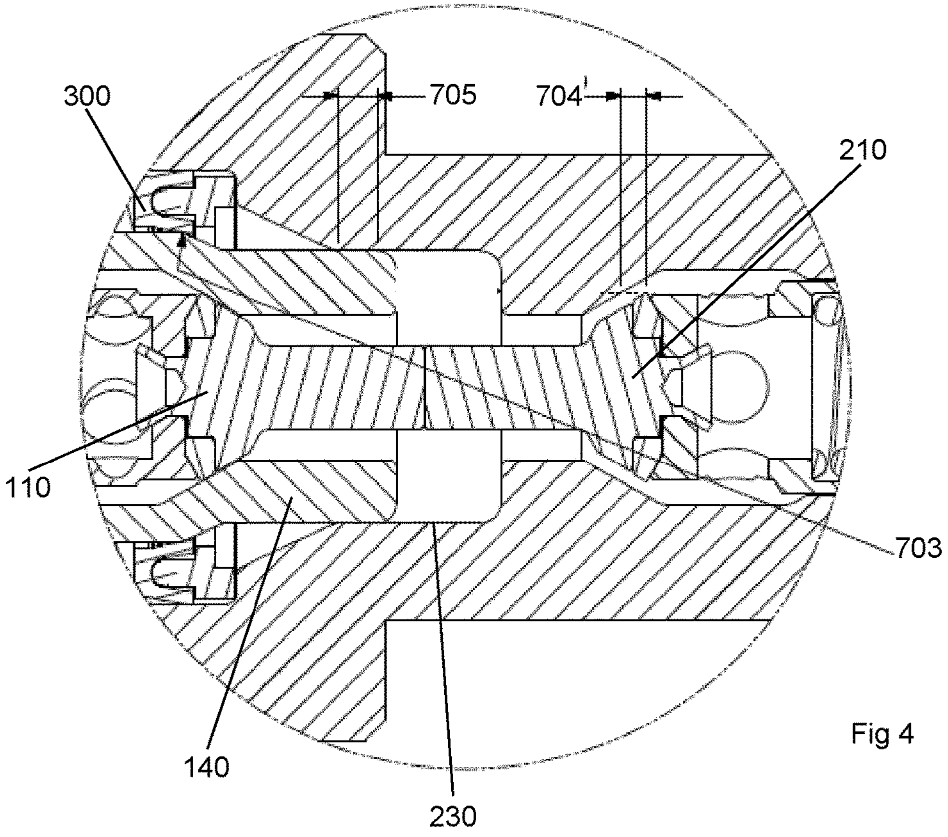
FIG. 4 is a diagrammatic illustration of a detail from FIG. 3.
Figure 5:
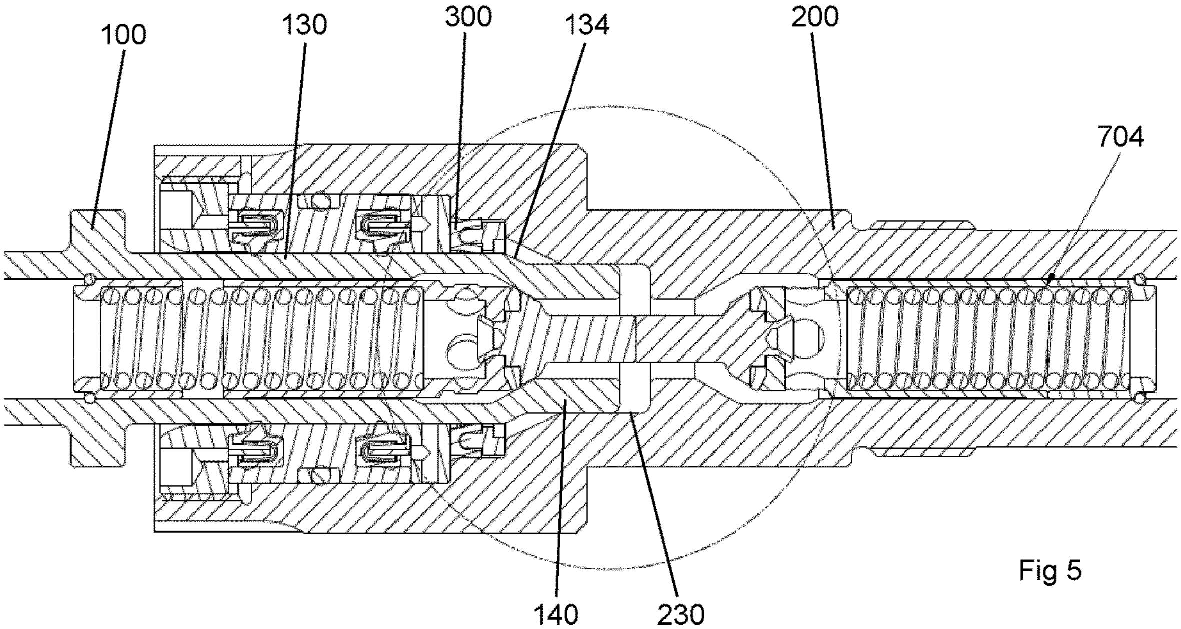
FIG. 5 is a diagrammatic illustration of a poppet coupling according to an exemplary embodiment of the disclosure.
Figure 6:
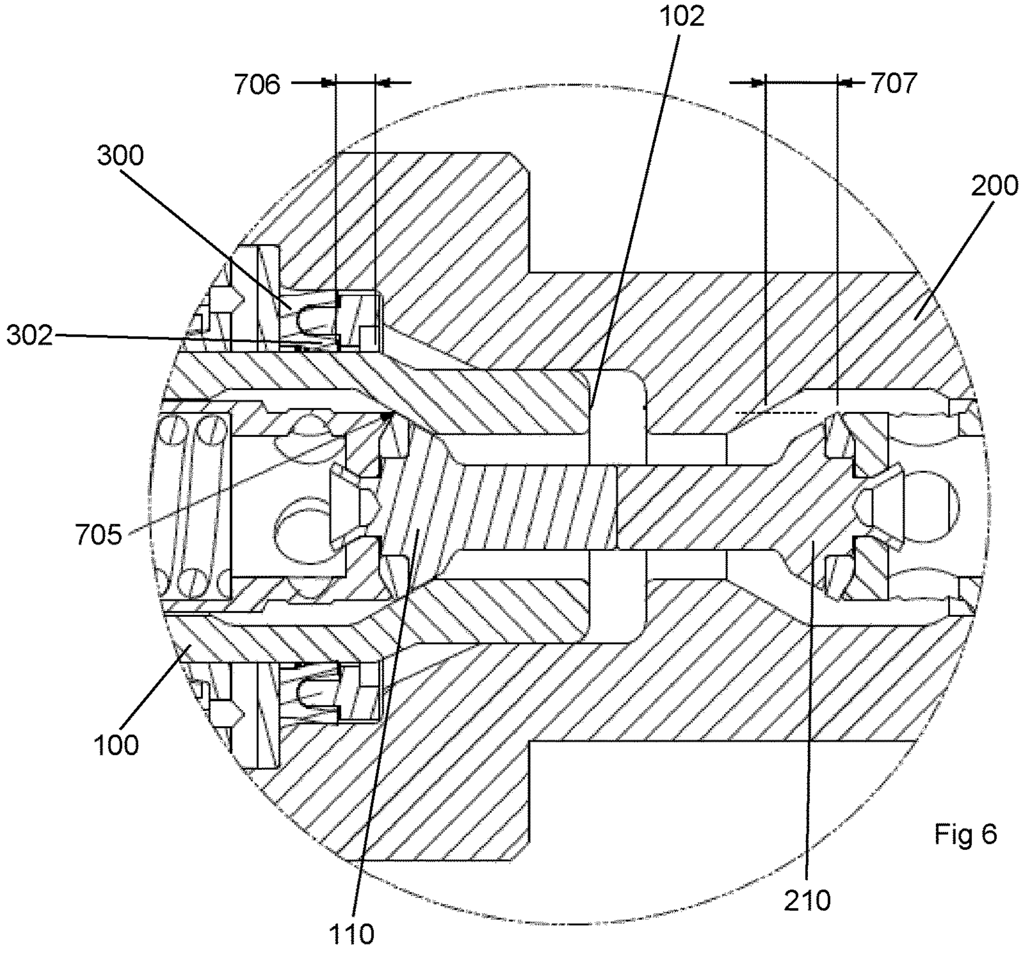
FIG. 6 is a diagrammatic illustration of a detail from FIG. 5.
Figure 7:
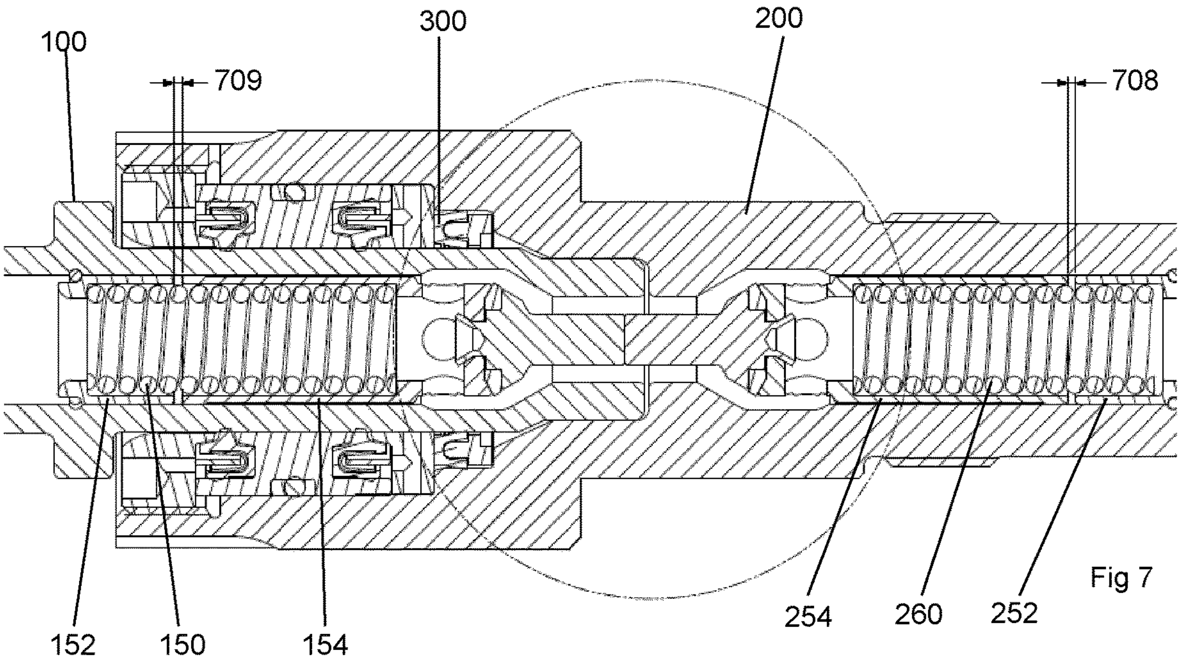
FIG. 7 is a diagrammatic illustration of a poppet coupling according to an exemplary embodiment of the disclosure.
Figure 8:
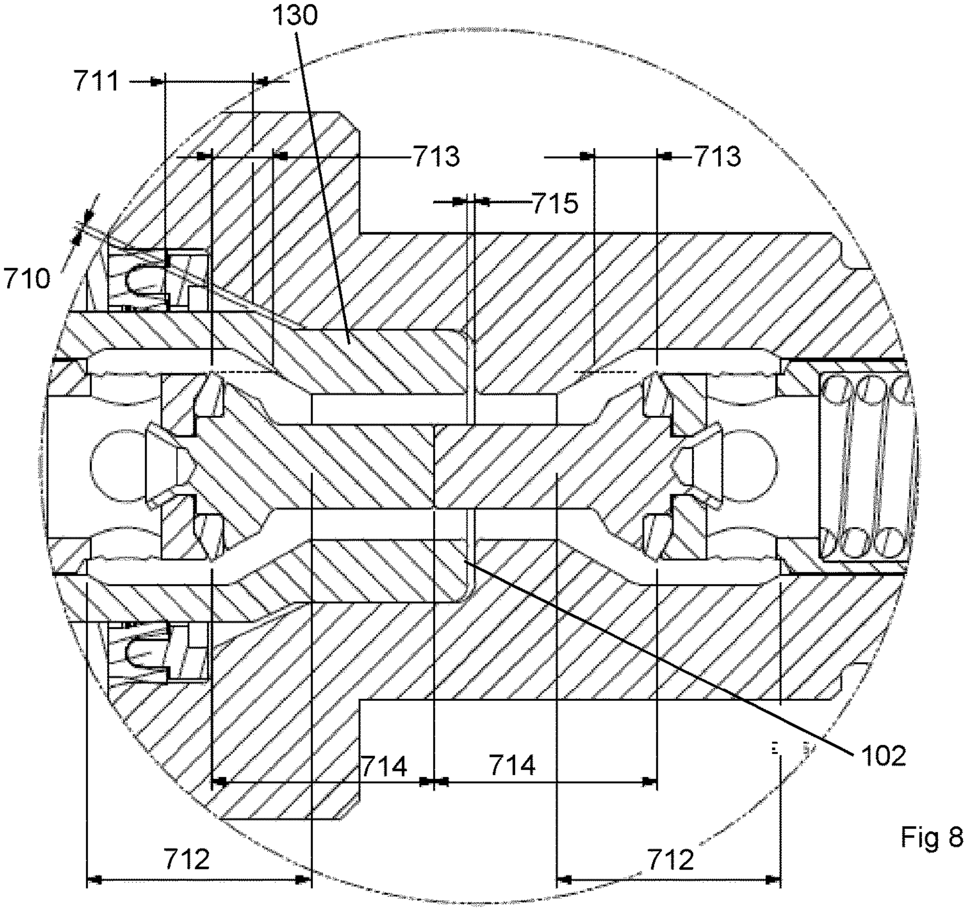
FIG. 8 is a diagrammatic illustration of a detail from FIG. 7.
Figure 9:
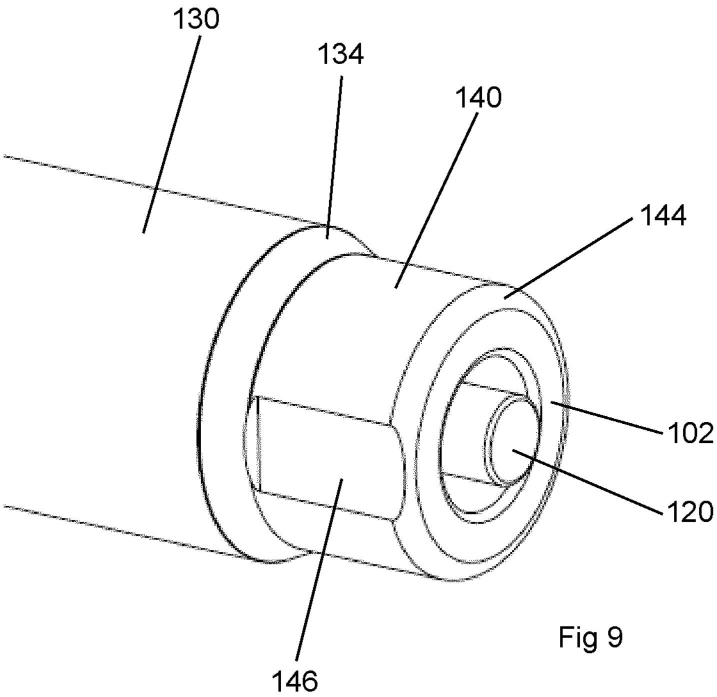
FIG. 9 is a diagrammatic illustration of a detail of a poppet coupling according to an exemplary embodiment of the disclosure.
Figure 10:
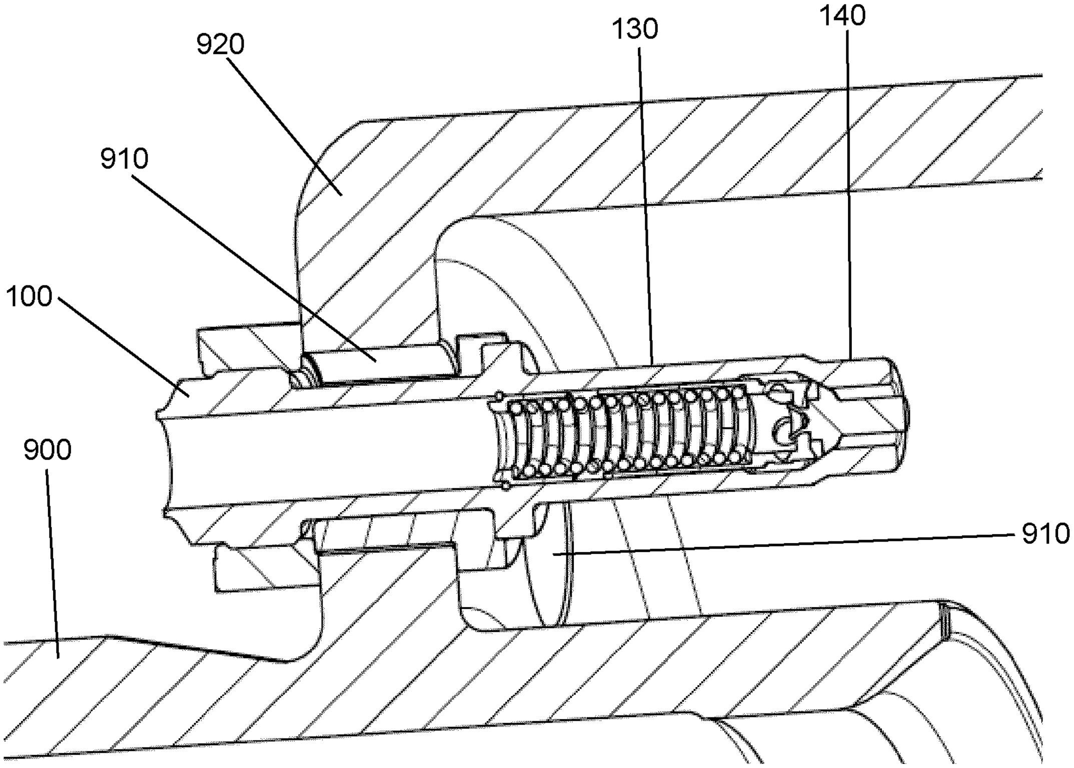
FIG. 10 is a diagrammatic illustration of a detail of a poppet coupling according to an exemplary embodiment of the disclosure.
Figure 11:
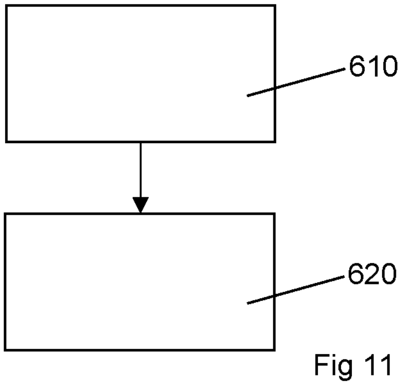
FIG. 11 is a diagrammatic illustration of a method according to an exemplary embodiment of the disclosure.

FIG. 1 shows an example embodiment of the poppet coupling with a male member 100 on the left-hand side and the female member 200 on the right-hand side. FIG. 2 shows an enlarged view of the detail in the circle in FIG. 1. FIG. 3 shows the same embodiment of the poppet coupling, with FIG. 4 showing an enlarged view of the detail in the circle in FIG. 3. FIG. 5 shows the same embodiment of the poppet coupling, with FIG. 6 showing an enlarged view of the detail in the circle in FIG. 5. FIG. 7 shows the same embodiment of the poppet coupling, with FIG. 8 showing an enlarged view of the detail in the circle in FIG. 7. FIGS. 1-8 show different and progressing steps of the male member 100 being inserted into the female member 200. FIG. 9 shows an embodiment of a cylindrical nose part, the front part, of the male member 100. FIG. 10 shows an embodiment where the male member 100 is attached to a subsea member. FIG. 11 is a flow diagram of the method.

In embodiments, the coupling is a subsea coupling for fluid, suitable for high pressure and high heat. For example, the coupling is operable for pressures of up to 138 MPa (1380 bar, 20 kpsi) from within the coupling, and at a temperature over 100 degrees of Celsius. A partial solution to at least some of the problems mentioned herein is to use a metal seal 300. This allows the coupling to operate at such high pressure and temperature. However, the metal seal 300 is not as flexible, nor as elastic, as polymer seals, or a secondary seal 400 or an environmental seal 500, as mentioned below of the female member 200. In embodiments, the male member 100 is held in a floating manner by one subsea member, as illustrated in FIG. 10. In embodiments, the female member 200 is held by another subsea member. This can cause misalignment between the male member 100 and the female member 200. When the two subsea members are moved toward each other the male member 100 and the female member 200 are connected with each other, as illustrated in FIGS. 1-8. In embodiments, to allow the metal seal 300 to seal properly and to avoid any permanent plastic deformation of the metal seal 300 or the sealing surface of the male member 100, the male member 100 and the female member 200 are aligned with each other before the metal seal 300 is in full engagement with its sealing surface. This alignment is made by a cylindrical nose part 140 entering a cylindrical opening 230 before the metal seal 300 of the female member 200 engages the male member 100. This is explained in more detail herein and with reference to all figures.

Turning to FIGS. 1 and 2, illustrating an example embodiment of the poppet coupling, the poppet coupling comprises a male member 100 and a female member 200. In embodiments, the male member 100 is held in a floating manner by a subsea member 900, as illustrated in FIG. 10. The male member 100 can be moved perpendicular to its axis to accommodate any misalignment between the male member 100 and the female member 200. In a further embodiment, this perpendicular movement is understood to comprise a setting where the male member is moved from a position with an angular deviation from an optimal position for engagement between the male member 100 and the female member 200 of the coupling to an optimal position for engagement between the members. In embodiments, the female member 200 is held by another subsea member. In embodiments, the female member 200 is held floating or non-floating. In an example embodiment, the male member 100 is arranged floating and the female member 200 is arranged non-floating.

The male member 100 comprises a cylindrical body part 130 and a cylindrical nose part 140. The cylindrical body part 130 comprises a first outer diameter 132. In embodiments, the cylindrical body part 130 also include sealing surfaces in its outer surface for interaction with seals arranged in the female member. In a further embodiment, such a sealing surface are of a different material or a mechanical treatment of the cylindrical body part 130. The cylindrical nose part 140 comprises a second outer diameter 142 at an end 102. The end 102 is the end of the male member 100 which is to be inserted into the female member 200 first. In embodiments, the end 102 is thus the distal end since a subsea member 900 holds the male member 100 at the other end. In embodiments, the first outer diameter 132 is larger than the second outer diameter 142.

The female member 200 comprises an end opening 250 for receiving the male member first, a primary seal 300 for engaging the cylindrical body part 130, a cone-shaped opening 240, and a cylindrical opening 230. The end opening 250 is the opening of the female member 200 that first receives the male member 100 when the male member 100 is inserted in the female member 200. The end opening 250 is thus a distal end of the female member 200, since a subsea member 900, in some embodiments, holds the female member 200 at the other end. Looking from the distal end, the end opening 250, and looking towards the other end, the proximal end, of the female member 200, the end opening 250 is followed by the primary seal 300, the cone-shaped opening 240, and the cylindrical opening 230. In embodiments, an environmental seal 500 and a secondary seal 400 are arranged between the end opening 250 and the primary seal 300 with the environmental seal 500 closest to the end opening 250. The cylindrical opening 230 has a first inner diameter 232 for receiving the cylindrical nose part 140. The cylindrical nose part 140 fits inside the cylindrical opening 230 in such a way that when the cylindrical nose part 140 slides into the cylindrical opening 230 the male member 100 is aligned with the female member 200. The cone-shaped opening 240 will assist in guiding the nose part 140 of the male member into the cylindrical opening 230 of the female member, thereby assisting in the alignment of the two members.

The primary seal 300 is a metal seal 300. In embodiments, the metal seal 300 is configured to withstand high temperatures and high pressures, such as for example 138 MPa (1380 bar, 20 kpsi) from within the coupling and/or over 100 or 200 degrees Celsius. In embodiments, the primary seal 300 is mounted into a cylindrical opening that is adjacent the cone-shaped opening 240 of the female member 200. In embodiments, a support ring 310 arranges and/or holds the primary seal 300 in place. In embodiments, the support ring 310 is made out of metal.

The second outer diameter 142, of the cylindrical nose part 140, and the first inner diameter 232, of the cylindrical opening 230, are complementary to allow the cylindrical nose part 140 to be slidable inserted into the cylindrical opening 230. This guides and aligns the male member 100 and the female member 200 prior to the male and female poppets interact, thereby achieving alignment when they engage and starts the opening process of the valve members of the male and female poppet parts of the coupling. In embodiments, the arrangement between the second outer diameter 142 and the first inner diameter 232 are such that, when about a quarter of the axial length of the cylindrical nose part 140 is within the cylindrical opening 230, then the male member 100 and the female member 200 are aligned. In some embodiments, this occurs when the primary seal 300 first engages the cylindrical body part 130 of the male member 100, as explained below. In embodiments, the metal seal 300 engages the sealing surface on the male member when the poppet of the male and female members of the poppet coupling are connected.

The cone-shaped opening 240 opens up from the cylindrical opening 230, and the cone-shaped opening 240 opens towards the end opening 250. The cone-shaped opening 240 guides the cylindrical nose part 140 into the cylindrical opening 230 during insertion of the male member 100 into the female member 200. The cone-shaped opening 240 is also formed with a rounded transition between the cone-shape and the proximal cylindrical opening 230.

The primary seal 300 is arranged between the end opening 250 and the cone-shaped opening 240. The primary seal 300 is arranged to seal against an outside of the cylindrical body part 130 with the first outer diameter 132 of the male member 140. The primary seal 300 should not be in contact with the cylindrical nose part 140 during insertion of the male member 100 into the female member 200. According to one embodiment, alignment of the male and female member prior to the poppets of the poppet coupling engaging and the primary seal interacting with the sealing surface ensures that the primary seal 300 or the sealing surface of the male member 100 is not damaged during insertion of the male member 100 and avoids any permanent plastic deformation of the metal seal 300 and damage to the sealing surface.

At least a part of the cylindrical nose part 140 is inside the cylindrical opening 230 when the primary seal 300 initially engages the outside of the cylindrical body part 130 with the first outer diameter 132 of the male member 140, when the male member 100 is inserted into the female member 200. During insertion, the primary seal 300 is protected by not engaging the cylindrical nose part 140. When the cylindrical nose part 140 enters the cylindrical body part 130, so that at least a part of the cylindrical nose part 140 is inside the cylindrical body part 130 and thereby are aligned relative to each other, first the primary seal 300 engages the outside of the cylindrical body part 130 with the first outer diameter 132 of the male member 140. In embodiments, if at least a quarter of the axial length of the cylindrical nose part 140 is within the cylindrical opening 230, then the male member 100 and the female member 200 are aligned, and, in a further embodiment, this occurs when the primary seal 300 first, initially, engages the cylindrical body part 130 of the male member 100. According to one embodiment, only a fifth of the axial length of the cylindrical nose part 140 is within the cylindrical opening 230. According to one embodiment, twice the distance of the axial length is a distance 711, see FIG. 8, between the primary seal 300 and the beginning of the cylindrical body part 130 with the first outer diameter 132, when the male member 100 is fully inserted into the female member 200.

In embodiments, the male member 100 comprises a first valve element 110 with a first extension 120. In embodiments, the female member 200 comprises a second valve element 210 with a second extension 220. In further embodiments, these extensions act as the poppet in the coupling. During insertion of the male member 100 into the female member 200 the first extension 120 and the second extension 220 engage each other to open the first valve element 110 and/or the second valve element 210. These extensions will also interact first after the nose part 140 of the male member is partly inserted into the inner cylindrical opening 230.

The insertion of the male member 100 into the female member so that the two are fully connected are explained by four steps and with reference to FIGS. 1-8. The first step is illustrated in FIGS. 1 and 2. Here, the male member 100 has just entered the end opening 250 of the female member 200 and progressed so that an end 102, the distal end, of the male member 100 just engages the cylindrical opening 230 of the female member 200. In this regard, see arrow 701 in FIG. 2. In FIG. 2, the primary seal 300 does not engage or seal against any part of the male member 100 so far during the insertion of the male member 100. This ensures that the primary seal 300 is not damaged and also ensures that the coupling parts are aligned prior to the primary seal 300 engages the sealing surface. In some embodiments, there is still an axial length 702 before a lip of the primary seal 300 engages the cylindrical body part 130 when the end 102 engages the cylindrical opening 230, as indicated by arrow 701. At this first step, both the first valve element 110 and the second valve element 210 are closed.

The second step is illustrated by FIGS. 3 and 4. Here, the cylindrical nose part 140 has entered the cylindrical opening 230, aligning the male member 100 with the female member 200. With the male member 100 and the female member 200 aligned, the male member engages the primary seal 300 without damaging the primary seal 300 or causing a permanent plastic deformation to the primary seal 300 or damaging the sealing surface of the male member 100. The seal 300 is just about to engage the cylindrical body part 130, indicated by arrow 703. This second step illustrates that at least a part 705 of the cylindrical nose part 140 is inside the cylindrical opening 230 when the primary seal 300 initially engages the outside of the cylindrical body part 130 with the first outer diameter 132 of the male member 140, as the male member 100 is inserted into the female member 200. An axial length 705 of the cylindrical nose part 140 is inside the cylindrical opening 230 and at this moment the primary seal 300 starts to engage the male member 100, as indicated by arrow 703. The extension of the male and female members are also engaged and start acting against each other. Thereby the second valve element 210 of the female member 200 opens 704 at this step 2, since the pressure in the male member 100 is larger than the pressure inside the female member 200. In some embodiments, this is adapted dependent on the use of the coupling, and dependent on the internal pressures in the coupling halves when connecting, by adapting the length of the extensions, cylindrical opening and nose part of the coupling halves.

The third step is illustrated by FIGS. 5 and 6. Here, the cylindrical nose part 140 is further inside the cylindrical opening 230. The primary seal 300 engages the outside of the cylindrical body part 130 with the first outer diameter 132 of the male member 140 and thereby the sealing surface of the male member 100. The primary seal 300 seals fully between the female member 200 and the male member 100. A part 706 of the cylindrical body part 130 has passed the primary seal 300, since it initially engaged the cylindrical body part 130. The second valve element 210 is pushed fully open, as indicated by arrow 707, since the pressure in the male member 100 is larger than the pressure inside the female member 200. The second valve element 210 has reached an open end position and cannot open any further as indicated by arrow 704 in FIG. 5. The first valve element 110 is just about to open and let fluid pass at 705.

The fourth step is illustrated by FIGS. 7 and 8. Here the cylindrical nose part 140 is inside the cylindrical opening 230. The primary seal 300 engages the outside of the cylindrical body part 130 with the first outer diameter 132 of the male member 140. The first valve element 110 and the second valve element 210 are fully and symmetrically open and fluid can pass, in any direction, between the male member 100 and the female member 200. The first extension 120 of the first valve element 110 contacts the second extension 220 of the second valve element 210, as they also do in steps two and three above.

FIG. 8 illustrates details from FIG. 7 when the poppet coupling is fully connected. The first extension 120 of the first valve element 110 contacts the second extension 220 of the second valve element 210, and there is full symmetry with respect to distances 712, 713 and 714 showing openings allowing fluid to flow in any direction. As shown in FIG. 8, the end 102 of the cylindrical body 130 leaves an opening, a distance, 715 to an end of the cylindrical opening 230. This allows fluid to pass from the poppet coupling via the opening 715, via the groove 146, via the clearance 710 to the primary seal 300. Hereby hydraulic lock is avoided.

With respect to FIGS. 8 and 9, the male member 100 and the female member 200 are arranged such that fluid can pass from the inside of the primary seal 300 to the inside of the male member 100 and the female member 200 when the poppet coupling is connected, or being connected. During steps two through four as illustrated in FIGS. 3-8, fluid is configured to pass from the inside of the primary seal 300, i.e., the right-hand side of the primary seal 300 in FIGS. 3-8, to the inside of the female member 200, and/or the male member 100, if the male member 100 opens first. This is achieved by the cylindrical nose part 140 comprising a groove 146, as illustrated in FIG. 9. With the groove 146, there is room for fluid to pass from the primary seal 300 to the end 102 of the male member 100 when the male member 100 is inserted into the female member, and also when the male member 100 and the female member 200 are fully connected. This avoids hydraulic locking, and allows water, or any other fluid, to escape during insertion of the male member 100 into the female member 200.

According to one embodiment, the cylindrical nose part 140 includes a rounded edge 144, see FIG. 9. This ensures that the cylindrical nose part 140 enters the female member 200 properly and prevents damage to the female member 200 during insertion. It also avoids hydraulic locking between the male and female members.

According to one embodiment, the male member 100 comprises the first valve element 110 with the first extension 120, and the female member 200 comprises the second valve element 210 with the second extension 220. As illustrated by FIGS. 1 to 8, the first extension 120 and the second extension 220 engage each other and open the first valve element 110 and/or the second valve element 210 when the primary seal 300 initially engages, see FIGS. 3 and 2, the outside of the cylindrical body part 130 with the first outer diameter 132 of the male member 140 when the male member 100 is inserted into the female member 200 to connect the coupling.

According to one embodiment, the primary seal 300 and the male member 100 are arranged such that the second valve element 210 is open when the primary seal 300 initially engages the outside of the cylindrical body part 130 when the male member 100 is inserted into the female member 200 to connect the coupling. This is illustrated by FIGS. 3 and 4, where the primary seal 300 just begins to seal against the cylindrical body part 130 of the male member 100 as the male member 100 is inserted into the female member 200.

According to one embodiment, the male member 100 comprises a cone-shaped surface 134 extending in the axial direction and connects the cylindrical body part 130 with the cylindrical nose part 140. The cone-shaped surface 134 is a part cone-shaped surface that extends, enlarges from the second outer diameter 142 of the cylindrical nose part 140 outward and to the first outer diameter 132 of the cylindrical body part 130. In embodiments, the first outer diameter 132 of the cylindrical body part 130 is larger than the second outer diameter 142 of the cylindrical nose part 140.

According to one embodiment, the end 102 of the cylindrical nose part 140 of the male member 100 comprises a circumferential rounded outer corner 144 and a groove 146 extending in the axial direction from the end 102 to the cone-shaped surface 134, as depicted in FIG. 9. This facilitates fluid to pass around the cylindrical nose part 140 and avoid a hydraulic lock of the parts. In embodiments, the end 102 is flat and extends perpendicular to axis of the male member 100. In embodiments, the end 102 has an opening through which the first extension 120 of the first valve element 110 extends.

According to one embodiment, the cone-shaped surface 134 is configured such that there is a clearance 710 between the cone-shaped surface 134 and the cone-shaped opening 240 when the male member 100 is fully inserted in the female member 200. This allows fluid to pass therebetween and avoids hydraulic lock. In embodiments, the cone-shaped surface 134 and the cone-shaped opening 240 have the same angle, and then a space, a clearance 710 as illustrated in FIG. 8, is present when the male member 100 is fully connected to the female member 200. Alternatively, the cone-shaped surface 134 and the cone-shaped opening 240 have different angles so as to create a clearance 710 in a similar way.

According to one embodiment, the primary seal 300 is a circumferential metal seal 300 held in place by a support ring 310. In embodiments, the metal seal 300 comprises a lip 302 for engaging the outside of the cylindrical body part 130 with the first outer diameter 132 of the male member 140. In embodiments, the end of the lip 302 faces towards, for example, the cylindrical opening 230 or the second valve element 210. In embodiments, the metal seal 300 is made out of steel, for example, stainless steel. In embodiments, support ring 310 is made out of steel, for example, stainless steel. In embodiments, the metal seal 300 is U-shaped, as also illustrated in FIGS. 1-8, with the support ring 310 supporting the metal seal in the opening of the U.

According to one embodiment, at least a quarter of an axial length of the cylindrical nose part 140 of the male member 100 is inside the cylindrical opening 230 before the primary seal 300 engages, initially engages, the outside of the cylindrical body part 130 with the first outer diameter 132 of the male member 140, when the male member 100 is inserted into the female member 200. During insertion of the male member 100, when at least a quarter of the axial length of the cylindrical nose part 140 is inside the cylindrical opening 230, first then, and not before, the primary seal 300 engages the outside of the cylindrical body part 130. In this way, the male member 100 and the female member 200 are aligned with each other when the male member 100 comes into contact with the primary seal 300. Hereby, damage and/or plastic deformation of the primary seal 300 is avoided. According to one embodiment, the axial length is two millimetres, or at least two millimetres.

According to one embodiment, the poppet coupling further comprises a secondary seal 400 and an environmental seal 500. In embodiments, the secondary seal 400 is positioned between the primary seal 300 and the environmental seal 500 when viewed in the axial direction of the female member 200. In embodiments, the environmental seal 500 seals the inside of the coupling against the outer environment when the male member 100 is fully inserted into the female member 200. In embodiments, the primary and secondary seal seal so that fluid within the coupling do not exit to the environment. In embodiments, the environment seal seals so that fluid in the environment do not enter the coupling from the outside. Hence they are sealing in different directions.

According to one embodiment, the secondary seal 400 and the environmental seal 500 are polymer seals, and are arranged in the female member 200 such that they seal against the cylindrical body part 130 when the cylindrical nose part 140 of the male member 100 engages the cylindrical opening 230. In embodiments, the secondary seal 400 and the environmental seal 500 are polymer seals comprising one or more lips for sealing and engaging the cylindrical body part 130 before the end 102 enters the cylindrical body part 130.

According to one embodiment, the poppet coupling further comprises a spring 260 arranged inside a first hollow cylinder 252 and a second hollow cylinder 254, a spring force of the spring 260 closing the second valve element 210 of the female member 200, and the two hollow cylinders 252, 254 are configured to limit an axial movement of the second valve element 210 within the female member 200. In embodiments, the two hollow cylinders 252, 254 have the same diameters. The two hollow cylinders 252, 254 engage each other's ends to limit the axial movement of the second valve element 210. The first hollow cylinder 252 covers a part of the spring 260, and the second hollow cylinder 254 covers another part of the spring 260.

According to one embodiment, the poppet coupling further comprises a spring 150 arranged in a third hollow cylinder 152 and a fourth hollow cylinder 154, a spring force of the spring 150 closing the first valve element 110 of the male member 100, and the two hollow cylinders 152, 154 are configured to limit an axial movement of the first valve element 110 within the male member 100. In embodiments, the two hollow cylinders 152, 154 have the same diameters. The two hollow cylinders 152, 154 engage each other's ends to limit the axial movement of the first valve element 110. The third hollow cylinder 152 covers a part of the spring 150, and the fourth hollow cylinder 154 covers another part of the spring 150.

According to one embodiment, one part of the coupling is arranged and connected to a fixed subsea element at a subsea location. According to one embodiment, the male member 100, and/or the female member 200, is arranged to freely move perpendicular to the direction of insertion relative to a connected subsea element. In embodiments, the male member 100, and/or the female member 200, are arranged floatingly perpendicular to the direction of insertion. This allows the male member 100 and the female member 200 to become aligned, concentric, when at least a part of the cylindrical nose part 140 is inserted into the cylindrical opening 230. In embodiments, a subsea member 900 floatingly holds the male member 100 and/or the female member 200. In embodiments, the subsea member is a fixed subsea structure, as a connection plate, or a subsea member to be connected to another fixed subsea member by, for instance, a remotely operated vehicle (ROV).

According to one embodiment, several poppet couplings are arranged to form a multi-poppet coupling between two subsea members 900, 930. Thus, in embodiments, each subsea member 900, 930 comprise each a MQC plate (multi-quick connector plate) 920, 940. In embodiments, the configuration is one poppet coupler combined with another coupler that are to be connected up simultaneously. In embodiments, for a subsea application, the male member of the connection assembly is positioned on the fixed subsea member 930 and the female member of the coupling on the retrievable subsea member 900. FIG. 10 illustrates a subsea member 900 comprising a MQC plate 920 floatingly holding a male member 100. A space 910 allows the male member 100 to move freely perpendicular to the direction of insertion. In embodiments, the radial movement is 1 to 10 millimetres. In embodiments, the subsea member 900 and its MQC plate 920 further comprise openings 910 for further male members 100.

According to one embodiment, a method for guiding and connecting the male member 100 and the female member 200 of the poppet coupling according to any one of the embodiments described herein. The male member 100 and the female member 200 being initially misaligned and subsea. The method comprises arranging 610 the male member 100, or the female member 200, so that they can move perpendicular to the direction of insertion; and inserting 620 the male member 100 into the female member 200. In this respect, please see FIG. 6. In an embodiment, the method comprises connecting a plurality of male members 100 and female member 200 of a multi-poppet coupling. In embodiments, the method includes making the insertion subsea with the poppet coupling submerged.

According to one embodiment, the poppet coupling is configured for a high pressure hydraulic fluid and to work with fluids having a high temperature. In embodiments, the hydraulic fluid has a pressure of 200 bar (20 MPa) or more, or 138 MPa (1380 bar, 20 kpsi). In embodiments, the hydraulic fluid has a temperature of 100 degrees Celsius or more, for example, 200 or 400 degrees Celsius.

According to at least one embodiment, a straightening, alignment, function is provided by the cylindrical nose part 140 of the male member 100. This allows the male member 100 to align with respect to the female member 200 such that the primary seal of the female member 200 always has optimal conditions for sealing. The primary seal 300 being a metal seal is less resilient and more easily gets a permanent plastic deformation than the more elastic seals used as secondary seal 400 and environmental seal 500. In an embodiment, the male member 100 is arranged on permanently installed equipment used subsea. In embodiments, the male member 100 is arranged in a floating manner so that the male member 100 can move and align with the female member 200. In embodiments, when the male member 100 is not fixed and held by a subsea member 900, and the female member 200 is held by another subsea member 930, there is a slight misalignment when the two subsea members 900, 930 connect. This misalignment is absorbed by the cylindrical nose part 140 of the male member 100 entering the cylindrical opening 230 of the female member 200.

Figure 12:
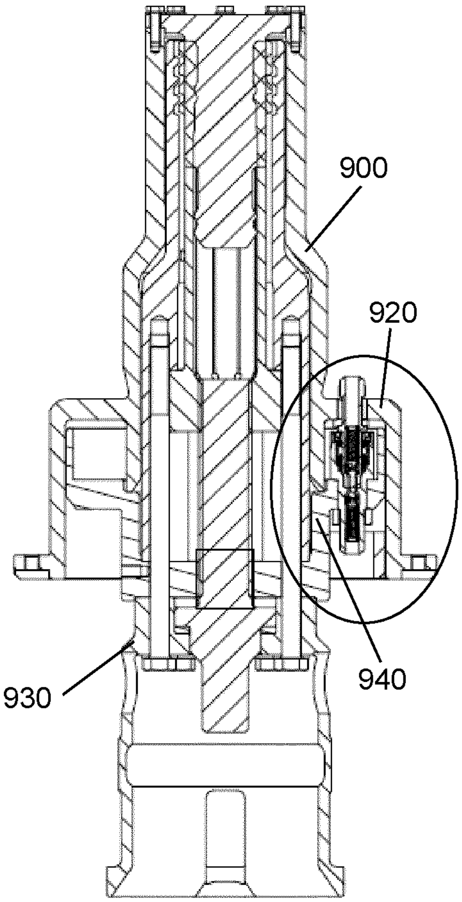
FIG. 12 is a diagrammatic illustration of a system comprising a poppet coupling according to an exemplary embodiment of the disclosure.
Figure 13:
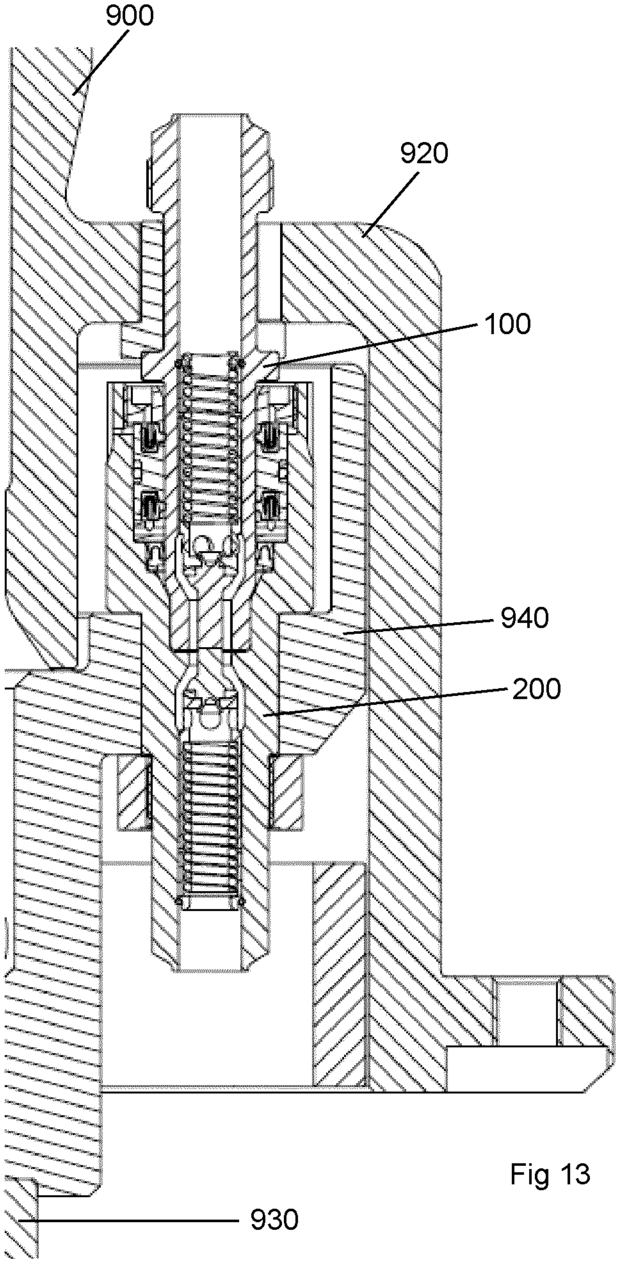
FIG. 13 is a diagrammatic illustration of the encircled detail of the system with the poppet coupling in FIG. 12 according to an exemplary embodiment of the disclosure.

According to one embodiment, a system comprises a plurality of poppet couplings according to any one of the preceding embodiments. In embodiments, the system further comprises a first subsea member 900 and a second subsea member 930. In embodiments, the first subsea member 900 comprises a first multi-quick connector (MQC) plate 920, and the first MQC plate 920 comprises the male members 100 of the plurality of poppet couplings. In embodiments, the second subsea member 930 comprises a second MQC plate 940, and the second MQC plate 940 comprises the female members 200 of the plurality of poppet couplings. In other embodiments, the converse is arranged, where the first MQC plate 920 comprises the female members 200 and the second MQC plate 940 comprises the male members 100. In embodiments, in reference to FIGS. 12 and 13, the first subsea member 900 is an inboard hub, and the second subsea member 930 is an outboard hub. In other embodiments, the converse is arranged, where the first subsea member 900 is an outboard hub, and the second subsea member 930 is an inboard hub. In embodiments, the first subsea member 900 and the second subsea member 930 are configured to coarsely align relative to each other when connected to each other. In embodiments, this connection is made subsea. In embodiments, each poppet coupling provide a further alignment and a subsequent fine alignment. As the first subsea member 900 and the second subsea member 930 connect and align to each other, there are further alignments made by each poppet coupling to ensure that any fluid connection is made securely without any leakage. Each poppet coupling achieves this as described above, namely through, in short, the cylindrical nose part 140 entering the end opening 250 and then the cylindrical nose part 140 entering the cone-shaped opening 240 and the cylindrical opening 230.

This written description uses examples to disclose the system and method disclosed herein and also to enable any person skilled in the art to practice the system, including making and using the adapters and performing the methods. Other examples may occur to those skilled in the art based on the present disclosure. Such other examples are intended to be within the scope of the present disclosure.

The invention claimed is:

1. A poppet coupling comprising:

a male member including a cylindrical body part and a cylindrical nose part, the cylindrical body part having a first outer diameter, the cylindrical nose part having a second outer diameter, the cylindrical nose part disposed at an end of the male member; and a female member including an end opening, a primary metal seal, a cone-shaped opening, and a cylindrical opening, the end opening configured for receiving the end of the male member, the primary metal seal for engaging the cylindrical body part, the cylindrical opening having a first inner diameter for receiving the cylindrical nose part, the cone-shaped opening opens outward from the cylindrical opening, the cone-shaped opening opens towards the end opening, the primary metal seal arranged between the end opening and the cone-shaped opening, wherein the second outer diameter and the first inner diameter are complementary to allow the cylindrical nose part to be slidably inserted into the cylindrical opening, wherein insertion of the cylindrical nose into the cylindrical opening respectively guides and aligns the male member and the female member, wherein the primary metal seal is configured to seal against an outside of the cylindrical body part with the first outer diameter of the male member, wherein at least a part of the cylindrical nose part is inside the cylindrical opening when the primary metal seal initially engages the outside of the cylindrical body part with the first outer diameter of the male member while the male member is inserted into the female member.

2. The poppet coupling according to claim 1, wherein the male member includes a first valve element with a first extension, and the female member includes a second valve element with a second extension, and wherein the first extension and the second extension engage each other and open at least one of the first valve element or the second valve element when the primary metal seal initially engages the outside of the cylindrical body part with the first outer diameter of the male member when the male member is inserted into the female member to connect the coupling.

3. The poppet coupling according to claim 2, wherein the primary metal seal and the male member are arranged such that the second valve element is open when the primary metal seal initially engages the outside of the cylindrical body part while the male member is inserted into the female member to connect the coupling.

4. The poppet coupling according to claim 1, wherein the male member further comprises a cone-shaped surface extending in an axial direction and connects the cylindrical body part with the cylindrical nose part, the first outer diameter of the cylindrical body part being larger than the second outer diameter of the cylindrical nose part.

5. The poppet coupling according to claim 4, wherein the end of the cylindrical nose part of the male member further comprises a circumferential rounded outer corner and a groove, the groove extending in the axial direction from the end to the cone-shaped surface.

6. The poppet coupling according to claim 4, wherein the cone-shaped surface is configured such that there is a clearance between the cone-shaped surface and the cone-shaped opening when the male member is fully inserted in the female member.

7. The poppet coupling according to claim 1, wherein the primary metal seal is a circumferential metal seal held in place by a support ring, the primary metal seal further comprising a lip for engaging the outside of the cylindrical body part with the first outer diameter of the male member.

8. The poppet coupling according to claim 1, wherein at least a quarter of an axial length of the cylindrical nose part of the male member is inside the cylindrical opening before the primary metal seal engages the outside of the cylindrical body part with the first outer diameter of the male member while the male member is inserted into the female member.

9. The poppet coupling according to claim 1, further comprising a secondary seal and an environmental seal, the secondary seal being positioned between the primary metal seal and the environmental seal, and the environmental seal seals the inside of the coupling against the outer environment when the male member is fully inserted into the female member.

10. The poppet coupling according to claim 9, wherein the secondary seal and the environmental seal are polymer seals and are arranged in the female member such that they seal against the cylindrical body part when the cylindrical nose part of the male member engages the cylindrical opening.

11. The poppet coupling according to claim 2, further comprising a first spring arranged inside a first hollow cylinder and a second hollow cylinder, the first spring biased to close the second valve element of the female member, and the first and second hollow cylinders are configured to limit an axial movement of the second valve element within the female member.

12. The poppet coupling according to claim 11, further comprising a second spring arranged in a third hollow cylinder and a fourth hollow cylinder, the second spring biased to close the first valve element of the male member, and the third and fourth hollow cylinders are configured to limit an axial movement of the first valve element within the male member.

13. The poppet coupling according to claim 1, wherein the male member or the female member is arranged to move perpendicular to the direction of insertion.

14. A poppet coupling system comprising:

a plurality of poppet couplings arranged to form a multi-poppet coupling between a first subsea member and a second subsea member, each poppet coupling including:

a male member including a cylindrical body part and a cylindrical nose part, the cylindrical body part having a first outer diameter, the cylindrical nose part having a second outer diameter, the cylindrical nose part disposed at an end of the male member, and a female member including an end opening, a primary metal seal, a cone-shaped opening, and a cylindrical opening, the end opening configured for receiving the end of the male member, the primary metal seal for engaging the cylindrical body part, the cylindrical opening having a first inner diameter for receiving the cylindrical nose part, the cone-shaped opening opens outward from the cylindrical opening, the cone-shaped opening opens towards the end opening, the primary metal seal arranged between the end opening and the cone-shaped opening, wherein the second outer diameter and the first inner diameter are complementary to allow the cylindrical nose part to be slidably inserted into the cylindrical opening, wherein insertion of the cylindrical nose into the cylindrical opening respectively guides and aligns the male member and the female member, wherein the primary metal seal is configured to seal against an outside of the cylindrical body part with the first outer diameter of the male member, wherein at least a part of the cylindrical nose part is inside the cylindrical opening when the primary metal seal initially engages the outside of the cylindrical body part with the first outer diameter of the male member while the male member is inserted into the female member.

15. The poppet coupling system according to claim 14, wherein:

the first subsea member includes a first multi-quick connector (MQC) plate, the first MQC plate including the male members of the plurality of poppet couplings; and the second subsea member includes a second multi-quick connector (MQC) plate, the second MQC plate including the female members of the plurality of poppet couplings, wherein the first subsea member and the second subsea member are configured to coarsely align relative to each other when connected to each other, and each of the plurality of poppet couplings provides a further alignment and a subsequent fine alignment.

16. A poppet coupling comprising:

a male member including a cylindrical body part and a cylindrical nose part, the cylindrical body part having a first outer diameter, the cylindrical nose part having a second outer diameter, the cylindrical nose part disposed at an end of the male member; and a female member including an end opening, a primary seal, a cone-shaped opening, and a cylindrical opening, the end opening configured for receiving the end of the male member, the primary seal for engaging the cylindrical body part, the cylindrical opening having a first inner diameter for receiving the cylindrical nose part, the cone-shaped opening opens outward from the cylindrical opening, the cone-shaped opening opens towards the end opening, the primary seal arranged between the end opening and the cone-shaped opening, wherein the second outer diameter and the first inner diameter are complementary to allow the cylindrical nose part to be slidably inserted into the cylindrical opening, wherein insertion of the cylindrical nose into the cylindrical opening respectively guides and aligns the male member and the female member, wherein the primary metal seal is configured to seal against an outside of the cylindrical body part with the first outer diameter of the male member.

17. The poppet coupling of claim 16, wherein at least a part of the cylindrical nose part is inside the cylindrical opening when the primary seal initially engages the outside of the cylindrical body part with the first outer diameter of the male member while the male member is inserted into the female member.

18. The poppet coupling of claim 16, wherein the male member includes a first valve element with a first extension, and the female member includes a second valve element with a second extension, and wherein the first extension and the second extension engage each other and open at least one of the first valve element or the second valve element when the primary seal initially engages the outside of the cylindrical body part with the first outer diameter of the male member when the male member is inserted into the female member to connect the coupling.

19. The poppet coupling of claim 18, wherein the primary seal and the male member are arranged such that the second valve element is open when the primary metal seal initially engages the outside of the cylindrical body part while the male member is inserted into the female member to connect the coupling.

20. The poppet coupling according to claim 16, wherein the male member further comprises a cone-shaped surface extending in an axial direction and connects the cylindrical body part with the cylindrical nose part, the first outer diameter of the cylindrical body part being larger than the second outer diameter of the cylindrical nose part.

* * * * *